United States Patent
Duez et al.

(10) Patent No.: US 6,614,530 B1
(45) Date of Patent: Sep. 2, 2003

(54) METHOD AND DEVICE FOR THE COLORIMETRIC MEASUREMENT OF A COLORED SURFACE

(75) Inventors: Christian Duez, Ath (BE); Jean-Louis Hubinon, Floriffoux (BE); Philippe Chevalier, Deinze (BE)

(73) Assignee: Biophotonics S.A., Lessines (BG)

( * ) Notice: Subject to any disclaimer, the term of this patent is extended or adjusted under 35 U.S.C. 154(b) by 0 days.

(21) Appl. No.: 09/831,294

(22) PCT Filed: Nov. 5, 1999

(86) PCT No.: PCT/BE99/00141
§ 371 (c)(1),
(2), (4) Date: May 4, 2001

(87) PCT Pub. No.: WO00/28289
PCT Pub. Date: May 18, 2000

(30) Foreign Application Priority Data

Nov. 6, 1998 (BE) .......................................... 09800814

(51) Int. Cl.⁷ ............................................... G01N 21/25
(52) U.S. Cl. ...................... 356/406; 356/405; 356/316
(58) Field of Search ................................ 356/406, 405, 356/407, 419

(56) References Cited

U.S. PATENT DOCUMENTS

| | | | |
|---|---|---|---|
| 3,597,094 A | 8/1971 | Goldwasser | 356/189 |
| 4,624,571 A | 11/1986 | Salda et al. | 356/406 |
| 4,838,697 A * | 6/1989 | Kurandt | 356/406 |
| 4,886,366 A * | 12/1989 | Kogure | 356/319 |
| 5,141,323 A * | 8/1992 | Kipphan et al. | 356/406 |
| 5,159,185 A | 10/1992 | Lehr | 250/205 |
| 5,724,259 A | 3/1998 | Seymour et al. | 364/526 |
| 5,892,585 A * | 4/1999 | Lianza et al. | 356/405 |
| 5,911,003 A | 6/1999 | Sones | 382/162 |
| 6,301,004 B1 * | 10/2001 | Jung et al. | 356/406 |

FOREIGN PATENT DOCUMENTS

| | | | |
|---|---|---|---|
| EP | 0 314 312 A | 5/1989 | G07D/7/00 |
| EP | 0 780 671 A1 | 6/1997 | G01J/3/46 |
| FR | 2 749 077 | 11/1997 | G01J/3/51 |
| JP | 410176953 A * | 6/1998 | |

OTHER PUBLICATIONS

Feb. 18, 2000 International Search Report for International Application No. PCT/BE9/00141.
Richard, Sones, Ph.D., "Applied Machine Vision '96", Jun. 1996 (10 pages).

* cited by examiner

Primary Examiner—Karl D. Frech
Assistant Examiner—Allyson Sanders
(74) Attorney, Agent, or Firm—McDonnell Boehnen Hulbert & Berghoff

(57) ABSTRACT

The present invention relates to a method for the colorimetric measurement of a defined region on an image representing a surface, characterized in that the said image of the said surface is taken using a color camera, in that the analogue information measured on the said surface is transformed and converted into digital form, in that the said defined region on the said image is delimited and in that the measurement of the chromatic values R, G, B is carried out for this region.

18 Claims, 3 Drawing Sheets

METHOD AND DEVICE FOR THE COLORIMETRIC MEASUREMENT OF A COLORED SURFACE

SUBJECT OF THE INVENTION

The present invention relates first of all to a process which allows the colorimetric and possibly dimensional measurement of a coloured surface and to the processing of the information measured on the said surface or on part of the latter.

The present invention also relates to the device for the calorimetric measurement of the said surface.

PRIOR ART

Many calorimetric measurement-taking devices are known which make it possible to give, by tristimulus measurement, values of the three chromatic parameters, R (red), G (green) and B (blue), of a calorimetric measurement. For this purpose, an illuminant is used so as to illuminate a surface on which the measurement will be taken. It should be pointed out that this measurement is normally a measurement of the average chromatic values of the illuminated surface.

Patent Application FR-A-2,749,077 has proposed a method and a device for measuring the colour by calculating the trichromatic components with respect to a colorimetric reference system. This calculation is made using a matrix for transferring the calorimetric system associated with the data acquisition system to the calorimetric reference system. The said transfer matrix is calculated by an iterative procedure based on the trichromatic components measured by the calorimetric reference system of the three primary colours. However, it is found that the measurements are taken using a tri-CCD camera having three CCD sensors—one CCD sensor for each of the three trichromatic components. The cost of this camera is relatively high. Furthermore, it is found that the illuminant is placed outside the acquisition system including the camera. This means that perturbations due to the surrounding (ambient) illumination will be picked up during measurement by the acquisition system. Furthermore, it is found that no dimensional or spatial processing of the image is possible with the system described in this publication.

Document U.S. Pat. No. 5,724,259 describes a method for monitoring the colour of a printed image on a substrate, which makes it possible, using a camera, to measure the light reflected from the said printed image onto the substrate, to transform this measurement into a signal sent to a computer and to use the information emanating from this signal to correct the effects of scattered light reflected from the printed image. The main use of this method is therefore to check the ink thickness in the case of applications of printing machines such as printers. For this purpose, the optical density defined by the logarithm to the base 10 of the reflectance, this being a percentage of the scattering of the incident light, is more specifically measured. For this purpose, a reference surface not incorporated into the apparatus is placed beside the printed image to be measured. This also means that the measurement is not a contact measurement but indeed a remote measurement.

Document EP-A-0,491,131 describes an apparatus for monitoring and calibrating the spectrum emitted by a coloured object using the dispersion of the wavelength provided by a variable filter. This is a calibrating apparatus working directly as a calorimeter. However, in the present case, because of the presence of a diffuser and a variable filter between the one-dimensional sensor and the object itself, it is estimated that no spatial information could be obtained by the use of such a device.

Document EP-A-0,314,312 describes a method and an apparatus making it possible to detect the presence of ink on a substrate using several light-emitting diodes (LEDs) of different wavelengths which are switched on and off independently of each other.

Document U.S. Pat. No. 3,597,094 describes a portable device allowing colour identification, which works directly with visual observation. This device comprises a plurality of filters positioned between a light source and the coloured surface.

OBJECTS OF THE INVENTION

One object of the present invention is to propose an improved method and an improved device which make it possible to obtain a calorimetric and dimensional (or spatial) measurement of a defined region on an image of a surface, which is possibly inhomogeneous, such as dot-matrix printing or a defect appearing on a captured surface.

This will allow a reproducible and reliable measurement of the chromatic parameters of the said defined region to be obtained.

The object of the present invention is also to propose a device and a method which make it possible to take stabilized measurements with respect to a reference standard.

The object of the present invention is also to allow the use of this information for medical, industrial, cosmetic and food applications or else in any other application using the technique of colorimetry.

MAIN CHARACTERISTIC ELEMENTS OF THE INVENTION

The present invention relates first of all to a method for the calorimetric and possibly dimensional measurement of a defined region on an image representing a surface. The method consists in taking an image of the said surface using a colour camera, in transforming and converting the analogue information measured on the said surface into digital form, preferably using a processing unit on board of the colour camera or in a computer, in delimiting the said defined region on the said image and in carrying out the measurement of the chromatic values R, G, B for this region.

The term "surface" should be understood to mean the surface for which it is desired to obtain colorimetric-type and/or dimensional-type information.

The term "image" should be understood to mean a group of pixels which represents the captured surface and which may be directly transmitted to a monitor such as a screen or a printer.

The term "region" should be understood to mean that part of the said image for which the calorimetric and/or dimensional measurement is carried out.

Optionally, the method also consists in measuring the distance between two pixels of the said image or in delimiting the included area during peripheral tracing of a region of the said image.

The definition of the said region may be carried out either manually by peripheral tracing, or automatically by scanning the various pixels of the image for which the chromatic parameters fall within a predetermined window or interval.

The present invention also relates to the device for implementing the said method, comprising a sensor provided with a colour camera and with an illuminant which are placed within the same enclosure associated with an analogue information acquisition system, the information being measured using the said sensor and being converted into digital form by a processing unit.

Preferably, the colour camera is a mono-CCD or mono-CMOS camera.

Preferably, the illuminant will be produced using a single, white or colour, diode or several identical, white or colour, diodes having the same spectral distribution.

According to a preferred embodiment, the sensor furthermore includes, within the same enclosure of the sensor, a reference standard placed in the field of view of the said camera. This makes it possible to stabilize each measurement.

According to a preferred embodiment, the information converted by the processing unit is transmitted to a monitor which may be a screen or a printer and which gives a precise display of the image. Optionally, using this monitor, the image may also be processed so as to measure the distance between two specific points or pixels, to measure the area of the said region, etc.

The data will be obtained by a tristimulus measurement of the R, G, B parameters, preferably by matrix computation.

DETAILED DESCRIPTION OF ONE EMBODIMENT OF THE PRESENT INVENTION

Figure 1:
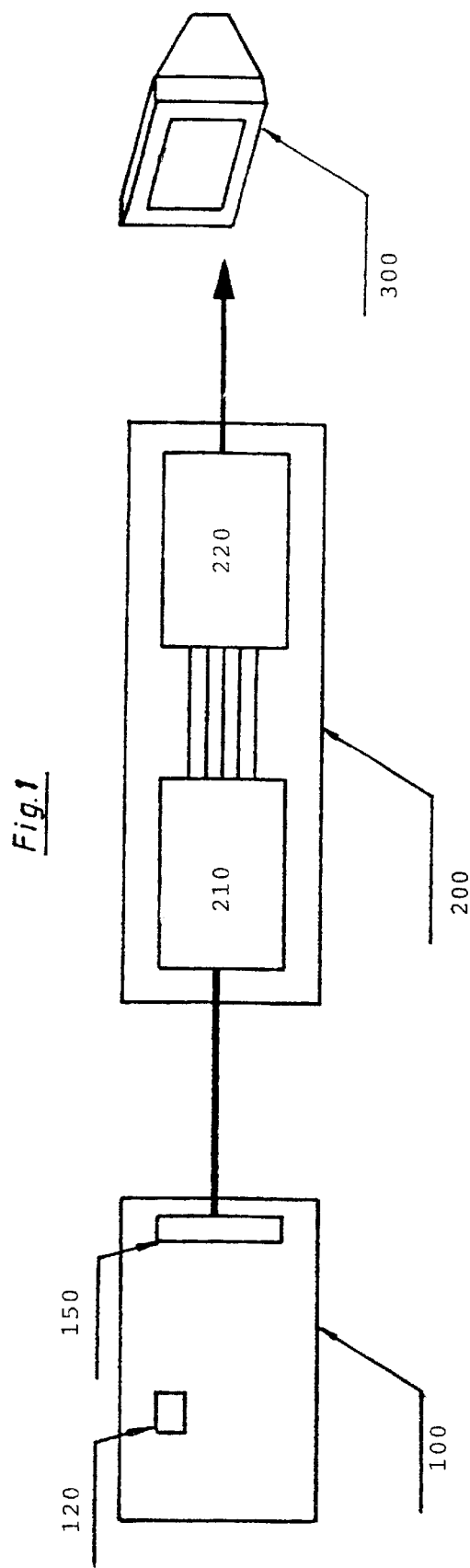
FIG. 1 shows an overall schematic view of the information acquisition system according to the invention.

FIG. 1 shows an overall schematic view of the acquisition system of analogue information relating to the measured chromatic values. The analogue information will be converted into digital form by the electronics. This acquisition system firstly comprises a sensor 100 which will be described in greater detail below and a processing unit 200 which processes the information captured by the camera and transmits them to a monitor 300. The processing unit is composed of a camera card 210 and a CPU card 220. The information is transmitted between the two cards digitally. The measurement head or sensor 100 is linked by a low-voltage flex to the camera card. This sensor essentially comprises, held within a single enclosure, a colour camera 150, preferably a mono-CCD or mono-CMOS camera, and an illuminant 120 which may consist of light-emitting diodes, these being, for example, white or other colours. The fact of integrating the illuminant into the actual measurement head makes it possible to get round the problem of environmental perturbations, given that the camera will be sensitive only to the image illuminated by the illuminant and not to the external (ambient) environment.

Figure 2:
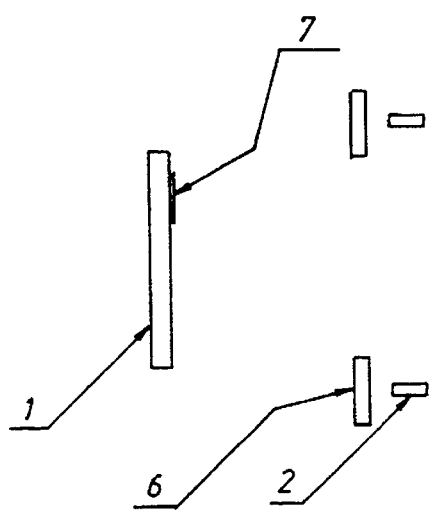
FIG. 2 shows an exploded view of the measurement sensor used in the acquisition system shown in FIG. 1.
Figure 2:
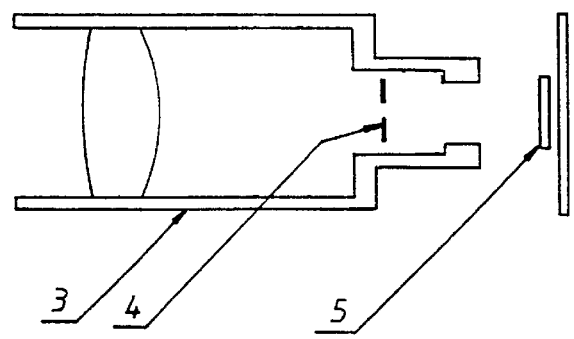

FIG. 2 shows this sensor in greater detail. Conventionally, it comprises an optional window 1 which may also protect the camera and the source from the external environment. The sensor will be placed directly on the surface of the specimen to be analyzed. Provision is made for the latter to be at the object distance from the objective, thus allowing a sharp image to be transmitted to the screen. The illuminant preferably consists of diodes geometrically integrated into the sensor in order to generate, possibly using a diffuser 6, light which is perfectly homogeneous over the entire surface to be measured. Homogenization of the illuminant may furthermore be achieved using an integrating sphere. The stability of the illuminant is guaranteed by controlling the current through the diodes. The optical barrel 3 of the camera is provided with a combination of lenses as well as with a diaphragm of well-defined dimensions, which allow the resolution of the sensor of the CCD colour camera 5 to be fully exploited.

Particularly advantageously, provision is also made to place, possibly in the internal field of view of the camera, such as for example on the internal or external face of the window, a well-defined colour reference standard so that the values measured while taking a measurement can always be measured with reference to the reference standard 7 during each measurement. Thus, the data obtained, including for the reference standard, will make it possible, at each measurement taken, to stabilize, that is to say to determine and evaluate, any drift in the sensor assembly and to take this into account during processing of the information and of the measured chromatic values.

The measurement is based on the tristimulus (R, G, B) method already mentioned above, the stability of which is ensured by the use of a stable reference surface. The interpretation of the measurements is performed, as required, in the various chromatic coordinate systems (xyY, Lab, etc.), depending on the choice of the user. The calculation of the co-ordinates is mainly performed by matrix calculation based on the RGB chromatic values measured by the sensor. Absolute or relative measurements may be obtained, for example by measuring the deviation from one colour with respect to another. The precision of the measurement will depend on the number of pixels selected (and therefore on the number of bits per pixel) for the measurement, possibly allowing interpretation of the image obtained on the screen of the monitor.

Particularly advantageously, not only the average chromatic value measured for a group of pixels but also the entire image may thus be transmitted, which may be stored, compared or transmitted to the outside. This technique furthermore allows very precise positioning of the sensor as well as repeated repositioning. It is found that the measurement time is of the order of one second and that the chromatic values are displayed almost instantaneously on a display and possibly simultaneously on the monitor interpreting the image.

Figure 3:
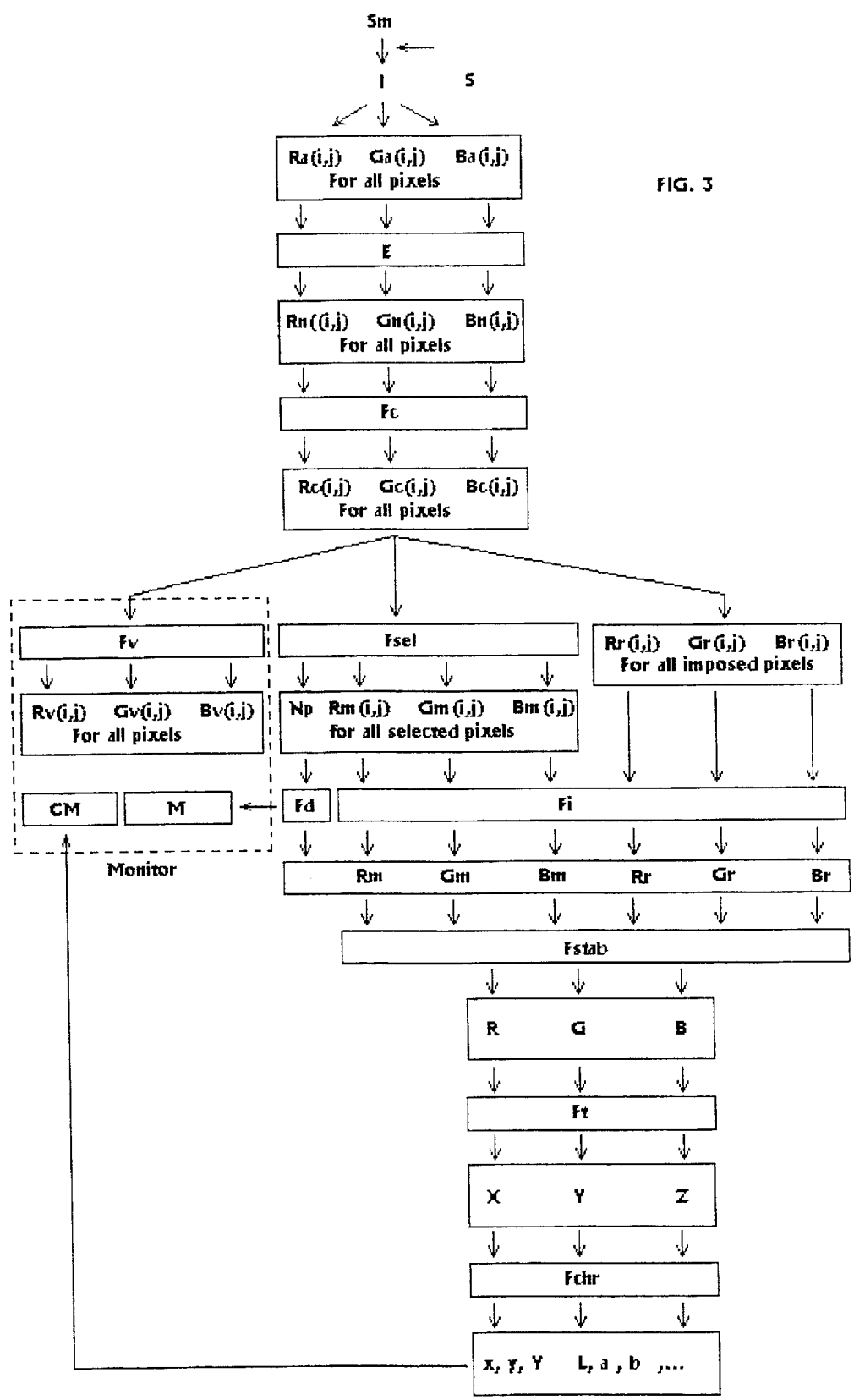
FIG. 3 shows the flow chart for the processing method for the measurement carried out on the image to be analyzed.

FIG. 3 shows the flow chart for the measurement. A surface Sm to be measured, illuminated by a source S, gives an image I exploitable by the sensor.

The colour camera possesses three types of pixels, representative of red, green and blue. The analogue information per pixel $Ra(i, j)$, $Ga(i, j)$, $Ba(i, j)$ (for all the pixels) will be converted into digital form by the electronics E into $Rn(i, j)$, $Gn(i, j)$, $Bn(i, j)$ (for all the pixels). In order to correct the imperfection in the homogeneity of the sensor and of the illuminant, an image correction function Fc gives, from $Rn(i, j)$, $Gn(i, j)$, $Bn(i, j)$ (for all the pixels), corrected values $Rc(i, j)$, $Gc(i, j)$, $Bc(i, j)$ (for all the pixels). This correction function per pixel is established by placing the sensor on homogeneous surfaces. These corrected values are then transferred by a video transfer function Fv in order to be able to display the image of $Rv(i, j)$, $Gv(i, j)$, $Bv(i, j)$ (for all the pixels) which is closest to reality, possibly taking into account the response of the monitor.

From the corrected values $Rc(i, j)$, $Gc(i, j)$, $Bc(i, j)$ (for all the pixels), a reference region $Rr(i, j)$, $Gr(i, j)$, $Br(i, j)$ (composed of a group of pixels Npr) is imposed and another measurement region Rm(i, j), Gm(i, j), Bm(i, j) (composed of a group of pixels Np) is chosen using a selection function Fsel. The number of pixels Np may be obtained from Rm(i, j), Gm(i, j), Bm(i, j) and from a dimensional measurement function Fd, making it possible to obtain distance or area metrology M. These measurements may be displayed on the monitor.

Being in possession of the reference Rr(i, j), Gr(i, j), Br(i, j) (for a group of pixels Npr), it is possible, using an integration function Fi, to find the values Rr, Gr, Br. The measurement of Rm(i, j), Gm(i, j), Bm(i, j) for a number of pixels Np gives Rm, Gm, Bm by integration.

With Rr, Gr, Br and Rm, Gm, Bm, it is possible to use a stabilization function Fstab (which eliminates the influence of the sensor on the temperature, etc.), giving R, G, B specific to the system.

In order to be able to give the chromatic values in a CIE reference system XYZ, a transfer function Ft is used, which gives XYZ from RGB. This XYZ system is not the only reference system. Consequently, by means of a calorimetric function Fchr, is possible to obtain and display the measured colour CM in xyY, Lab, LCH, etc.

Several peripheral devices can be used to transfer this data, such as a connection to another computer, to a printer, to a network, etc.

What is claimed is:

1. A method for a calorimetric measurement of a defined region on an image representing a surface, comprising:
    illuminating the region by using a sensor comprising an illuminant;
    capturing an image of the region with a colour camera which is present in the sensor;
    capturing an image of a reference area which is in a field of view of the colour camera, the reference area being present on the sensor;
    defining the region on the image during manual selection by peripheral tracing; and
    converting analogue information characterizing the image into digital form, thereby stabilising the image of the region by using the reference information.

2. A method for a colorimetric measurement of a defined region on an image representing a surface, comprising:
    illuminating the region by using a sensor comprising an illuminant;
    capturing an image of the region with a colour camera which is present in the sensor;
    capturing an image of a reference area which is in a field of view of the colour camera, the reference area being present on the sensor;
    defining the region on the image automatically by scanning the pixels which have chromatic values lying within a predetermined interval; and
    converting analogue information characterizing the image into digital form, thereby stabilising the image of the region by using the reference information.

3. The method of claim 1 or 2, wherein a dimensional measurement of the defined region is carried out.

4. A method for a colorimetric measurement of a defined region on an image representing a surface, comprising:
    illuminating the region;
    capturing an image of the region with a colour camera;
    capturing an image of a reference which is not on the surface; and
    converting analogue information characterizing the image into digital form, thereby stabilising the image of the region by using the reference information,
    wherein the region is defined during manual selection by peripheral tracing.

5. An analogue information acquisition system for implementing the method according to claim 1, comprising in combination:
    a sensor, comprising an enclosure, which includes at least a camera, an illuminant, and a reference of defined colour placed in the field of view of the camera, the reference on a window which allows an internal part of the sensor to be protected; and
    a processing unit, for converting the image measured by the sensor into digital form and for making it possible for the defined region, the chromatic parameters of which it is desired to know, to be precisely delimited; and
    an output device.

6. The system of claim 5, wherein the camera is a CCD colour camera or a CMOS colour camera.

7. The system of claim 5, wherein the illuminant is produced using at least one light-emitting diode, wherein each of the at least one light-emitting diodes is identical and has the same spectral distribution, and wherein one of the at least one light emitting diodes is a white or colour light-emitting diode.

8. An analogue information acquisition system for implementing a method for the colorimetric measurement of a defined region on an image representing a surface, comprising the steps of: illuminating the region; capturing an image of the region with a colour camera; capturing an image of a reference which is not on the surface; and converting the analogue information characterizing the image into digital form, thereby stabilising the image of the region by using the reference information, comprising in combination:
    a sensor, comprising an enclosure, which includes at least a camera, an illuminant, and a reference of defined colour placed in the field of view of the camera;
    a processing unit, for converting the image measured by the sensor into digital form and for making it possible for the defined region, the chromatic parameters of which it is desired to know, to be precisely delimited; and
    an output device,
    wherein the reference is placed on a window that allows the internal part of the sensor to be protected.

9. A method for colorimetric measurement of a defined region on an image representing a surface, the method comprising:
    illuminating at least a portion of the surface using a sensor device comprising an illuminant;
    obtaining an image of at least a portion of the surface using a colour camera which is present in the sensor device;
    transforming and converting at least a portion of analogue information in the image into digital form;
    selecting a region on the image;
    deriving from the image obtained by the colour camera, a set of colorimetric values (Rm, Gm, Bm), of points within the region; and
    imposing a reference area and obtaining a set of colorimetric values (Rr, Gr, Br) of points within the reference area, the reference area being present in a field of view of the colour camera, the reference area being placed on the sensor device.

10. Method according to claim 9, further comprising the step of performing a stabilization of the colorimetric values of the region by applying a stabilization function using as input to the function the calorimetric values (Rm, Gm, Bm) of the region, as well as the reference values (Rr, Gr, Br) and obtaining as output of the function a set of stabilized calorimetric values (R, G, B) of the region.

11. Method according to claim 9, wherein a dimensional measurement of the defined region is performed.

12. Method according to claim 9, wherein the region is defined during manual selection by peripheral tracing.

13. Method according to claim 9, wherein the region to be measured is selected automatically by scanning pixels which have chromatic values within a predetermined interval.

14. Device for implementing the method according to claim 9 comprising:
- a sensor comprising an enclosure which includes a camera, an illuminant, and a reference of a defined colour, the reference placed in the field of view of the camera;
- a processing unit for converting the image measured by the sensor into digital form, the processing unit for delimiting the region and obtaining chromatic parameters; and
- an output device.

15. Device according to claim 14, further comprising means for performing stabilization of colorimetric values of a selected region, by applying a stabilization function, using as input to the function values (Rm, Gm, Bm) as well as a set of reference values (Rr, Gr, Br) and obtaining as output of the function a set of stabilized calorimetric values (R, G, B).

16. Device according to claim 14, characterized in that the camera is a CCD colour camera or a CMOS colour camera.

17. Device according to claim 14, characterized in that the illuminant is produced using a single, white or colour, light-emitting diode or using a plurality of identical, white or colour, light-emitting diodes having the same spectral distribution.

18. Device according to claim 14, characterized in that the reference is placed on a window which allows an internal part of the sensor to be protected.

* * * * *